United States Patent [19]

Schwarz

[11] Patent Number: 4,523,789
[45] Date of Patent: Jun. 18, 1985

[54] WHEEL COVER AND RETENTION CLIP

[76] Inventor: James Schwarz, P.O. Box 9310, Daytona Beach, Fla. 32020

[21] Appl. No.: 639,595

[22] Filed: Aug. 10, 1984

[51] Int. Cl.³ .......................... B60B 7/02; B60B 7/06
[52] U.S. Cl. ............................ 301/37 P; 301/37 CD
[58] Field of Search ............... 301/37 R, 37 P, 37 C, 301/37 CD, 108 A

[56] References Cited

U.S. PATENT DOCUMENTS

| | | | |
|---|---|---|---|
| 3,873,161 | 3/1975 | Kretschmer | 301/37 CD X |
| 3,876,257 | 4/1975 | Buerger | 301/37 C X |
| 4,003,604 | 1/1977 | Connell | 301/37 CD |
| 4,363,520 | 12/1982 | Connell | 301/37 P |
| 4,383,716 | 5/1983 | Osborn | 301/37 P X |

Primary Examiner—David A. Scherbel
Attorney, Agent, or Firm—Macdonald J. Wiggins

[57] ABSTRACT

A wheel cover and retaining clip system for a vehicle wheel having a molded plastic cover with circumferentially spaced retaining clip bosses. Each boss includes a retaining clip recess and a buttress. The buttress contacts the wheel flange and a J-shaped spring clip disposed in the recess engages the tire rim safety hump. The buttress prevents loosening of the retaining clip due to distortion of the wheel cover.

12 Claims, 11 Drawing Figures

WHEEL COVER AND RETENTION CLIP

BACKGROUND OF THE INVENTION

1. Field of the Invention

The present invention relates to vehicle wheel covers and the like and more particularly to a plastic wheel cover having clip-type retainers for securing the cover to an axial flange of a wheel.

2. Description of the Prior Art

Due to the limited design capabilities and weight of steel wheel covers, the tendency in the industry has been to utilize plastic wherever possible. Therefore, it is known to prepare wheel covers from plastic which are painted or decorated to have a desired attractive appearance. Such wheel covers are held in place by the use of a number of spring steel clip structures fitting into bosses of the plastic wheel covers. The distal ends of such clips may have cam surfaces, barbs, or tabs which may fit into recesses in the wheel structure. Several problems have arisen from the use of all plastic wheel covers. One problem is due to the heat generated in the wheels, especially on the newer front wheel driven vehicles. This problem is especially acute with disk-type brakes which tend to generate more heat than shoe-type brakes. This heat, when transmitted to the rim and to the plastic bosses of the wheel covers via the spring clips, causes distortion of the plastic and has the effect of loosening the purchase of the clips into the rim. Thus, loss of expensive wheel covers frequently occurs.

One solution of this problem is the use of improved plastics having higher melting points and greater resistance to distortion from heat. While feasible, such plastics greatly increase the cost of the wheel covers. A second problem is the tendency of the retention forces present in the spring steel clips to be transmitted to the plastic wheel covers which may not be sufficiently rigid to resist or absorb such forces. In many cases, the covers deflect or flex, thereby reducing the retention forces resulting in loss of covers. In other cases, the retention forces can cause, over an extended period of time, permanent creep or flow of the plastic with a loss in retention forces. Thus, there is a need for a plastic wheel cover and retaining clip system which can be implemented with low-cost plastic, yet will be free from the problem of distortion of the cover.

SUMMARY OF THE INVENTION

The present invention is an improved wheel cover and retaining clip system which resists distortion due to heat and the retention forces in the clips. A plastic wheel cover is provided having a plurality of inwardly extending bosses circumferentially spaced around the rear or inside surface of the cover. Each boss includes a recess for the installation of a retaining spring clip. The spring clips of the invention are formed from spring steel bent into a J shape. The J clip is provided with an inner arm portion which, when installed, extends axially into the recess of the wheel cover boss. Barbed tabs are provided in the inner arm portion of the clip which bite into the sidewalls of the recess and securely hold the clip therein. The J portion of the clip comprises a transition from the inner arm in the form of a bight to a short, outer arm portion. The bight, advantageously, is made somewhat larger and more flexible than prior J-shaped clips, as will be discussed more fully hereinafter and includes a stiffening rib. The outer arm portion has each lateral edge cut and bent upward to form a pair of barbs at the outer end and a barbed tab is formed in the center of the outer area portion. When the wheel cover is installed on a wheel, the barbs drop into the annular inner safety groove region of the rim and are under outward radial tension which tends to force the sharp points of the barbs into the inner annular safety groove portion of the wheel rim. The flexibility of the bight portion of the clip permits removal of the wheel cover without damage to the clip or boss.

Each wheel boss includes a buttress portion extending radially inward from the inner face of the boss. The buttress is formed to contact the circumferential wheel flange which extends axially and is welded to the inner surface of the wheel rim. As will be understood, any tendency of the plastic wheel cover or boss to warp or distort, such that the retaining clip tension would be reduced and its purchase on the safety groove lessened, is not possible since the wheel flange prevents such movement of the boss. Thus, a rigid support for the retaining clips is provided.

As may now be understood, the invention utlizes a molded plastic wheel cover in which the spring retaining bosses are formed to snugly fit over the wheel flange portion of the wheel and to hold a flexible spring retention clip in a recess therein in which a barbed portion of the clip engages the rim surface in the safety groove region. Heat transmitted to the wheel cover therefore cannot warp the cover so as to lessen the contact between the retaining clips and the rim, and the bosses are rigidly supported to resist the retaining forces.

It is therefore a principal object of the invention to provide an improved plastic wheel cover and spring clip retaining system which will prevent loosening of the wheel cover from high heat developed during operation of the vehicle.

It is another object of the invention to provide a plastic molded wheel cover having a plurality of inwardly extending spring clip bosses including buttresses for contacting the wheel flange when installed such that the wheel flange will prevent loosening of the retention clips.

It is still another object of the invention to provide a plastic molded wheel cover having a plurality of inwardly extending spring clip bosses including buttresses for contacting the wheel flange when installed such that the bosses can absorb retention forces from the spring clips without distortion.

It is yet another object of the invention to provide an improved plastic wheel cover having spring steel J clips for retaining the wheel cover on a wheel having greater than normal flexibility to provide ease of removing the wheel cover without damage.

These and other objects and advantages of the invention become apparent from the following detailed description when read in conjunction with the drawings.

DETAILED DESCRIPTION OF THE PREFERRED EMBODIMENT

Figure 1:
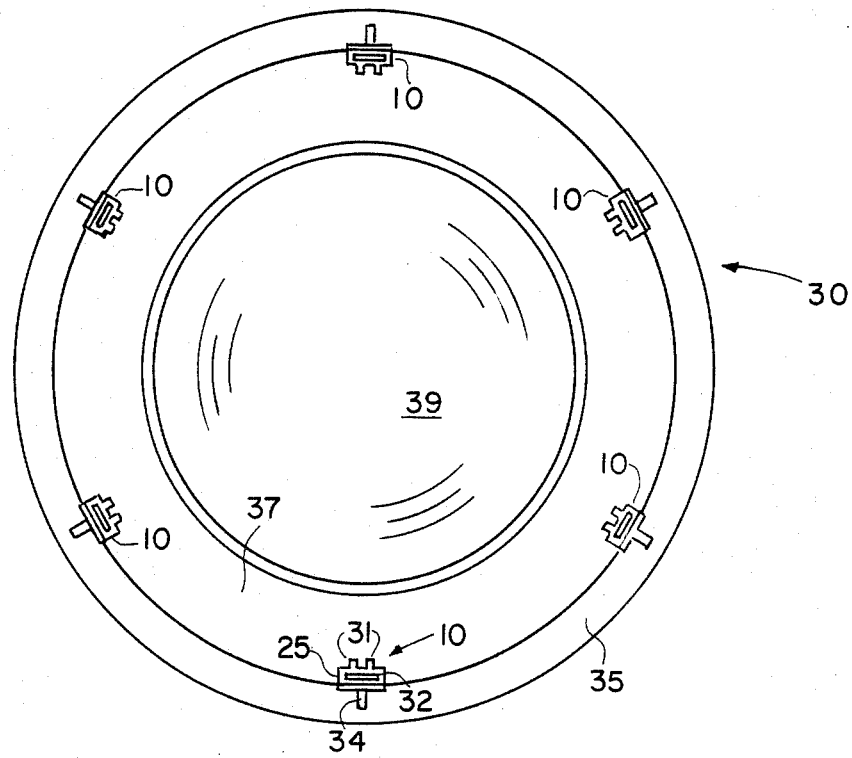
FIG. 1 is a plan view of the inner or rear surface of a typical wheel cover in accordance with the invention.

FIG. 1 is a view of the rear or inner side of a plastic wheel cover 30 in accordance with the invention. Molded into the rear surface of wheel cover 30 is a plurality of circumferentially spaced retainer bosses 10. Although six bosses 10 are shown in this example, it is to be understood that any number which will provide efficient retention of the wheel cover 30 is suitable. Details of boss 10 are indicated with respect to the lower boss and in FIGS. 2 and 3. FIG. 3 is a cross-sectional view through the plane 3—3 of FIG. 2. Boss 10 includes a body portion 25 having a retaining clip recess 32 molded therein. Recess 32 may be seen in FIGS. 2 and 3 having a spring retainer clip 5 inserted therein. Projecting radially inward from a surface of body 25 are backup buttresses 31. Although two buttresses are shown, a single buttress may be utilized. Wheel cover 30 may, if desired, include an outer rim 35 around the periphery thereof. A web 34 is provided between outer rim 35 and body 25 for supporting outer rim 35 and for acting as a stop when seating wheel cover 30 on a wheel. This may be best seen in FIG. 3 showing a cross-sectional view of a portion of wheel cover 30 installed on a wheel 20 having tire rim 15 attached thereto.

Figure 2:
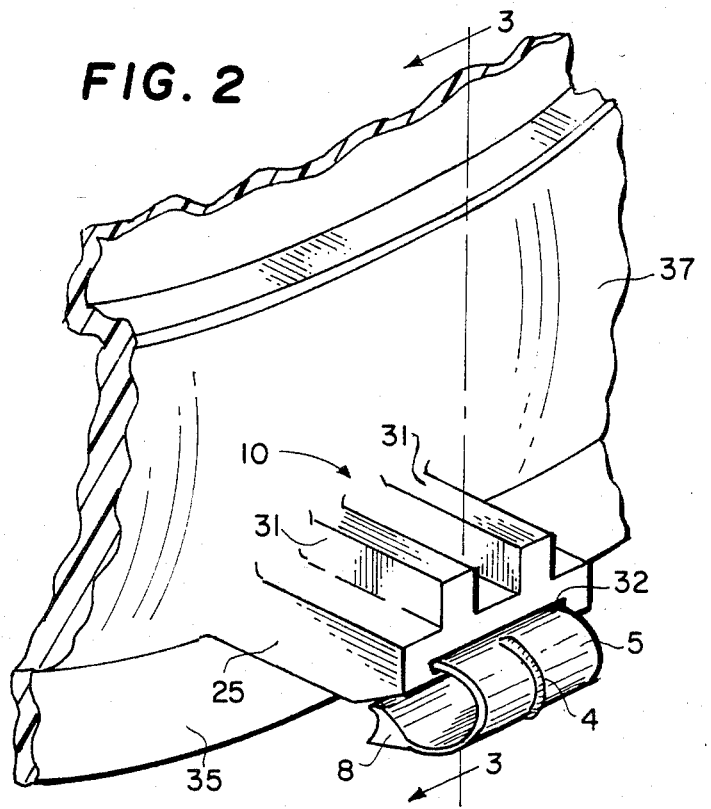
FIG. 2 is a partial perspective view of the rear surface of a plastic wheel cover in accordance with the invention showing the improved steel-retaining clip and boss.
Figure 3:
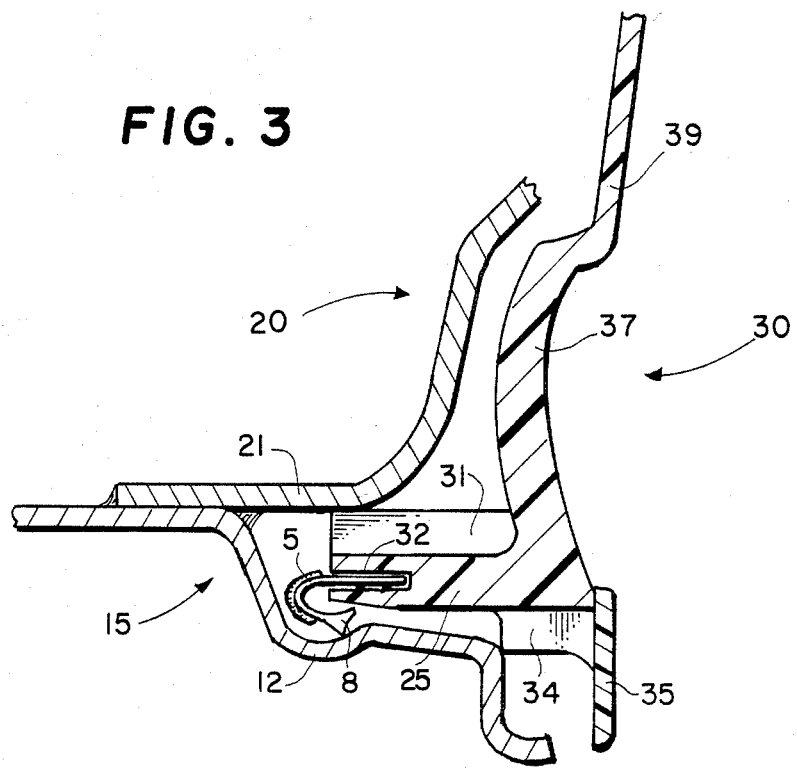
FIG. 3 is a cross-sectional view through the plane 3—3 of a portion of the plastic wheel cover of FIG. 1 installed on a wheel and wheel rim.
Figure 4:
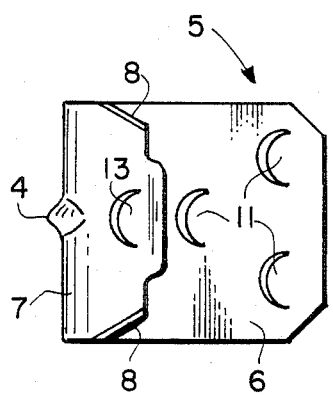
FIG. 4 is a plan view of the steel spring retaining clip shown in FIGS. 2 and 3.
Figure 5:
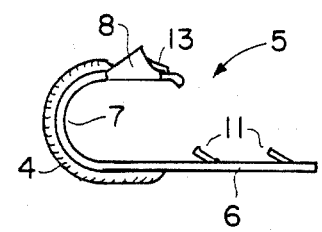
FIG. 5 is a side view of the spring clip of FIG. 4.

For exemplary purposes only, wheel 30 is indicated in FIGS. 1, 2, and 3 as having a central disk portion 39, a recessed border 37, and an outer rim 35. As will be obvious to those skilled in the art, any desired style of decorative wheel covers may be utilized with the invention. Wheel cover 30 is molded from a plastic as is well known in the art. Advantageously, the invention permits the use of a relatively low-cost plastic without the problems of heat distortion experienced in the prior use of low-cost plastics. A retaining clip 5, used in conjunction with the invention, is illustrated in FIGS. 4 and 5. Clip 5 formed from suitable spring steel includes an inner arm 6, a bight portion 7, and a short outer arm 9. A reinforcing rib 4 is formed along the bight portion 7 of the clip 5. Outer arm 9 has its corners 8 bent at 90° to thereby form sharp barbs. Barbed tabs 11 are formed in inner arm 6 to secure clip 5 in recess 32 of boss 10 and a similar barb 13 in outer arm 9. Bight 7 of clip 5 has a larger radius than prior art clips of similar design so as to provide greater flexibility.

The operation of the improved wheel cover and retention clip system of the invention may be understood from the cross-sectional view in FIG. 3. Here, a wheel 20 having a radial extending flange 21 is attached to tire rim 15 having an annular safety hump groove 12. A retaining clip 5 is inserted in each of the recesses 32 of bosses 10 such that barbs 11 dig into the plastic of body 25 to prevent dislodgement of clips 5 when a wheel cover is removed. The wheel cover is installed on wheel 20 and rim 15 as shown with web 34 acting as a stop. As will be noted, a surface of buttress 31 contacts the outer surface of wheel flange 21 while clip 5 is placed under tension and corner barbs 8 grip the surface of annular safety groove 12.

Any tendency of boss 10 to warp or distort due to heat generated when the vehicle is in operation is resisted by buttress 31 and body 25. Any expansion of boss 10 would tend to compress the bight of clip 5 slightly increasing the gripping action thereof rather than loosening as in the case of prior art wheel covers in which the body of a boss may warp radially inward, loosening the grip of a retaining clip.

ALTERNATIVE EMBODIMENTS

Although the preferred embodiment of the invention described above is admirably suited for its purpose, it is important that the retaining clip 5 be properly installed in recess 32 of boss 25 as shown in FIG. 3. If the worker does not seat clip 5 all the way into recess 32, barbs 8 will contact safety hump 12 at the wrong point and may produce insufficient tension. Two alternative clip designs and recess designs have been developed which ensure that the wheel retaining clip is properly installed in the boss recess.

Figure 6:
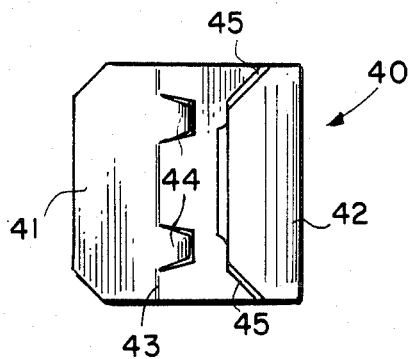
FIG. 6 is a plan view of an alternative clip design.
Figure 8:
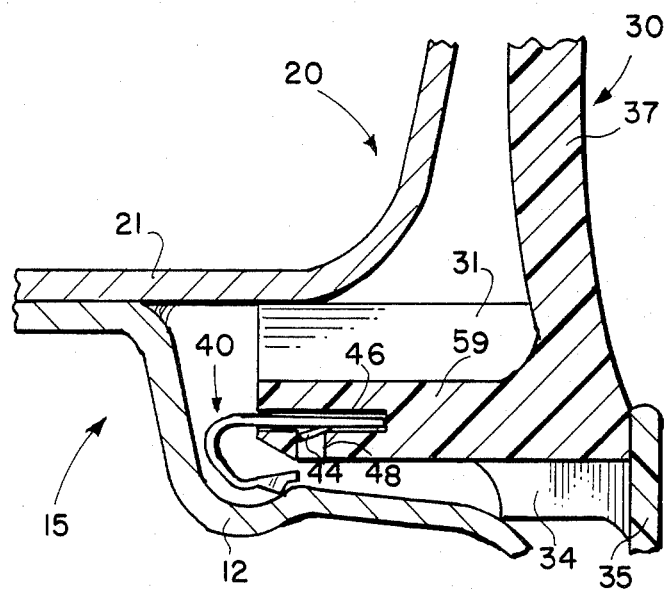
FIG. 8 is a partial cross-sectional view of a plastic wheel cover installed on a wheel and wheel rim showing an alternative recess design in the wheel boss.
Figure 7:
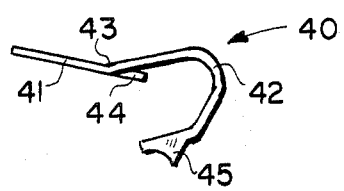
FIG. 7 is a side view of the clip design of FIG. 6.

Turning to FIGS. 6, 7, and 8, one alternative design is disclosed. Clip 40 is formed from spring steel and utilizes two barbs 44 in the inner arm 41. Although trapezoidal shaped barbs 44 are illustrated, it would be clear that triangular or semi-circular designs may be used equally well. As best seen in FIG. 7, inner arm 41 is bent slightly along a line 43. As shown in the cross-sectional view of boss 49 in FIG. 8, a recess 46 is provided for clip 40 in the form of a straight slot. Two additional openings at right angles to recess 46, one of which is seen at 48, is provided such that barb tabs 44 will catch in openings 48 when clip 40 is fully inserted. As may be understood, the worker will feel the point at which tabs 44 snap into openings 48. The slight bend along line 43 will be straightened out when clip 40 is installed in recess 46 and the tension thus created assists in holding clip 40 rigidly in place. Barbs 45 contact safety hump 12 at the desired point producing the required tension in clip 40.

Figure 9:
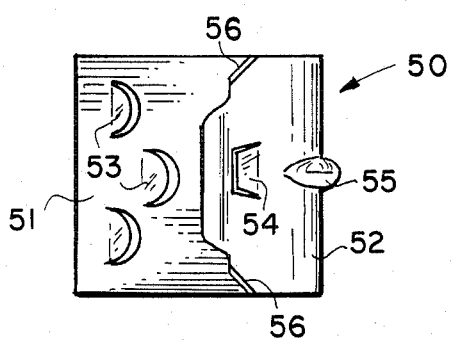
FIG. 9 is a plan view of another alternative retaining clip.
Figure 11:
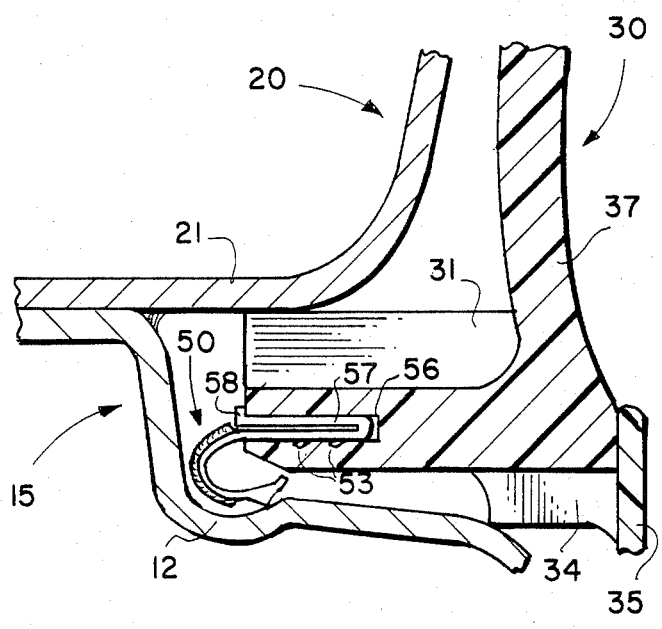
FIG. 11 is a partial cross-sectional view of a plastic wheel cover installed on a wheel and wheel rim showing the alternative clip of FIG. 9 installed in a recess in the wheel boss.
Figure 10:
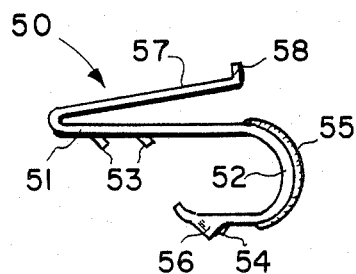
FIG. 10 is a side view of the alternative clip of FIG. 9.

A second alternative clip and recess design is illustrated in FIGS. 9, 10, and 11. FIG. 9 shows a top view of the second alternative clip 50 formed from spring steel and having a set of three barbed tabs 53 in intermediate arm 51. As best seen in the side view of clip 50 of FIG. 10, an inner arm 57 having the same width as intermediate arm 51 is bent almost 180° with respect to intermediate arm 51 and has a right angle bend 58 at its distal end. A short outer arm 61 is connected to intermediate arm 51 by bight 52 which includes a strengthening rib 55.

FIG. 11 shows a partial cross-section of plastic wheel cover 30 installed on wheel 20 and rim 15. Boss 59 includes a recess 56 having sufficient thickness to accept the double thickness of inner arm 57 and intermediate arm 51 of clip 50. When clip 50 is to be installed in recess 56, the folded end of inner arm 57 and intermediate arm 51 is inserted into recess 56 and pushed in until right angle edge 58 contacts the outer surface of boss 59. As will be understood, this insures that clip 50 is inserted to the proper depth. Since clip 50 is preferably formed from spring steel, inserting in recess 56 closes inner arm 57 against intermediate arm 51 such that the tension thereby produced forces barbs 53 into the plastic sidewalls of boss 59 adding additional security for holding clip 50 in place.

Although the present invention has been explained with reference to plastic wheel covers, it will be obvious to those of skill in the art to use other materials such as powdered metals, and combinations of metal and plastic and to make various modifications in the design of the spring clips and the wheel cover bosses without departing from the spirit and scope of the invention.

I claim:

1. A wheel cover and retaining clip system for a vehicle wheel having an axially aligned flange attached to a tire rim, said rim having an annular safety hump comprising:
 a circular wheel cover molded from plastic;
 a plurality of retainer bosses integral with and circumferentially spaced around said wheel cover, each of said bosses including a body portion disposed essentially axially, a retaining clip recess in said body portion, and a buttress integral with said body portion and extending radially inward therefrom; and
 a J-shaped spring clip, said clip having an inner arm portion, a short outer arm portion, and a bight forming a transition from said inner arm portion to said outer arm portion, said inner arm portion having a plurality of barbed tabs formed therein and said outer arm portion terminating in a pair of upwardly bent barbs;
 whereby said upwardly bent barbs are adapted to engage the interior of said annular safety hump and said buttress is adapted to contact said wheel flange when said wheel cover is installed on said wheel.

2. The system as defined in claim 1 in which said spring clip is formed from spring steel.

3. The system as defined in claim 2 in which said bight of said clip includes a stiffening rib formed therein.

4. The system as defined in claim 1 in which said body portion of each of said retainer bosses includes a radially outward extending web for forming a rim contacting stop for said wheel cover.

5. In a wheel cover for a vehicle wheel having an annular flange attached to a circular tire rim, said rim having an annular safety groove therein, a clip retainer and clip retaining boss comprising:
 a body portion disposed essentially axially adjacent the periphery of the wheel cover, said body portion having an axially aligned recess therein;
 a buttress integral with said body portion and adapted to contact the annular flange when the wheel cover is installed on the vehicle wheel; and
 a J-shaped spring clip, said clip having an inner arm portion, a short outer arm portion, and a bight forming a transition from said inner arm portion to said outer arm portion, said inner arm portion having a plurality of barbed tabs formed therein and said outer arm portion terminating in a pair of upwardly bent barbs, said inner arm disposed in said recess having said outer arm portion extending radially outward, such that said outer arm barbs contact the annular safety groove and said spring clip is stressed to produce retention forces when the wheel cover is installed on the vehicle, said boss thereby absorbing such retention forces without distortion of the wheel cover.

6. A wheel cover and retaining clip system for a vehicle wheel having an axially aligned flange attached to a tire rim, said tire rim having an annular safety hump comprising:
 a circular wheel cover molded from plastic;
 an essentially J-shaped spring clip, said clip having an inner arm portion, a short outer arm portion, and a bight forming a transition from said inner arm portion to said outer arm portion, said inner arm portion having a pair of barbed tabs along a transverse line across said inner arm portion, said inner arm portion slightly bent along said transverse line, and said outer arm portion terminating in a pair of upwardly bent barbs; and
 a plurality of retainer bosses integral with and circumferentially spaced around said wheel cover, each of said bosses including an axially oriented clip recess in said body portion, at least one opening extending radially outward from said recess, and a buttress integral with said body portion and extending radially inward therefrom;
 whereby said inner arm portion of said spring clip is insertable in said recess and said barbed tabs are adapted to engage said radially outward extending opening and said upwardly bent barbs are adapted to engage an interior surface of said annular safety hump and said buttress is adapted to contact said wheel flange when said wheel cover is installed on said wheel.

7. The system as defined in claim 6 in which said clip is formed from spring steel.

8. The system as defined in claim 7 in which said recess is adapted to cause said spring clip inner arm portion to straighten out when inserted therein thereby producing tension to assist retention of said spring clip in said recess.

9. A wheel cover and retaining clip system for a vehicle wheel having an axially aligned flange atached to a tire rim, said rim having an annular safety hump comprising;
 a circular wheel cover molded from plastic;
 a plurality of retainer bosses integral with and circumferentially spaced around said wheel cover, each of said bosses including a body portion disposed essentially axially, a retaining clip recess in said body portion, and a buttress integral with said body portion and extending radially inward therefrom; and
 an essentially J-shaped spring clip, said clip having an inner arm portion, an intermediate arm portion, a short outer arm portion, and a bight forming a transition from said intermediate arm portion to said outer arm portion, said inner arm portion formed as a folded over extension of said intermediate arm portion, said inner arm portion having a distal end bent to form a right angle end, said intermediate arm portion having a plurality of barbed tabs formed therein and said outer arm portion terminating in a pair of uppwardly bent barbs;
 whereby said folded-over inner arm portion and intermediate arm portion are adapted to be inserted into said retaining clip recess to cause said right angle distal end portion thereof to contact said retainer boss body portion and said upwardly bent barbs are adapted to engage an interior surface of said annular safety hump and said buttress is adapted to contact said wheel flange when said wheel cover is installed on said wheel.

10. The system as defined in claim 9 in which said spring clip is formed from spring steel.

11. The system as defined in claim 10 in which said folded-over inner arm portion and said intermediate arm portion are under tension when inserted in said recess thereby forcing said barbed tabs to bite into said plastic boss.

12. The system as defined in claim 9 in which said bight of said clip includes a stiffening rib formed therein.

* * * * *